(12) United States Patent
Shetty (10) Patent No.: US 11,206,257 B1
(45) Date of Patent: Dec. 21, 2021

(54) ATTENDANCE TRACKING CONFIGURATION FOR A MOBILE DEVICE

(71) Applicant: West Corporation, Omaha, NE (US)

(72) Inventor: Santhosh Shetty, Omaha, NE (US)

(73) Assignee: West Corporation, Omaha, NE (US)

( * ) Notice: Subject to any disclaimer, the term of this patent is extended or adjusted under 35 U.S.C. 154(b) by 259 days.

(21) Appl. No.: 16/134,226

(22) Filed: Sep. 18, 2018

(51) Int. Cl.
*H04L 29/06* (2006.01)
*H04L 29/08* (2006.01)
*G06F 16/22* (2019.01)
*G06F 16/955* (2019.01)

(52) U.S. Cl.
CPC .......... *H04L 63/0838* (2013.01); *G06F 16/22* (2019.01); *G06F 16/955* (2019.01); *H04L 63/0876* (2013.01); *H04L 63/108* (2013.01); *H04L 67/22* (2013.01)

(58) Field of Classification Search
CPC ............. H04L 63/0838; H04L 63/0876; H04L 63/108; H04L 67/22; G06F 16/599; G06F 16/22
See application file for complete search history.

(56) References Cited

U.S. PATENT DOCUMENTS

| 10,616,278 | B1* | 4/2020 | Johansson | H04L 65/403 |
| 2013/0081114 | A1* | 3/2013 | Bell | H04L 63/0861 726/5 |
| 2014/0040628 | A1* | 2/2014 | Fort | G09C 5/00 713/182 |
| 2014/0278629 | A1* | 9/2014 | Stephenson | G06Q 10/1091 705/7.13 |
| 2016/0132971 | A1* | 5/2016 | Teh | G06Q 40/125 705/32 |

* cited by examiner

*Primary Examiner* — Tri M Tran (57) ABSTRACT

One example method of operation may include receiving an access attempt from a user device, retrieving a user identifier associated with the user device stored in a database, creating a data tuple having three or more data elements based on the access attempt from the user device, storing the data tuple in the database, the data tuple includes at least a one-time code generated by an access device, a current time and the user identifier, and logging a successful access attempt by the user device when the user identifier is identified as being part of a list of user identifiers.

17 Claims, 6 Drawing Sheets

ATTENDANCE TRACKING CONFIGURATION FOR A MOBILE DEVICE

TECHNICAL FIELD OF THE APPLICATION

This application relates to attendance tracking based on sets of data to identify accurate attendance, and more specifically to attendance tracking for a mobile device.

BACKGROUND OF THE APPLICATION

Conventionally, when a person arrives at a particular location, such as a meeting, conference, or other event, the known attendance of the user is not identified beyond an initial check-in performed at a meeting table or other manual entry point. Generally, a user has a smartphone or other computing device that can be used to check-in to a conference room or meeting. Some other examples of a check-in may be a global positioning satellite (GPS) application that identifies the user at a particular place at a particular time and/or a QR code displayed on a meeting doorway which can be scanned via a particular application as a one-time access operation. The checking-in process does not identify a user's presence for a particular period of time and does not guarantee that the person ever attended a meeting as the person could walk away from the meeting the moment the check-in is confirmed.

In another example, smartcard readers, which are configured to identify a user's assigned smartcard, can be installed at various locations throughout a building facility to identify whether a person is actually in attendance, accessed the reader, and/or entered a particular location. This approach is costly as the readers must be installed everywhere there is a location of interest, such as a room with a security feature. However, the user may hold the door for another user and not swipe their card thus breaking down the security features of a smartcard system configuration.

SUMMARY OF THE APPLICATION

Example embodiments of the present application provide at least a method that includes at least one of receiving an access attempt from a user device, retrieving a user identifier associated with the user device stored in a database, creating a data tuple comprising three or more data elements based on the access attempt from the user device, storing the data tuple in the database, wherein the data tuple comprises at least a one-time code generated by an access device, a current time and the user identifier, and logging a successful access attempt by the user device when the user identifier is identified as being part of a list of user identifiers.

Example embodiments of the present application provide at least a method that includes at least one of a system that includes a user device and a security server configured to receive an access attempt from the user device, retrieve a user identifier associated with the user device stored in a database, create a data tuple comprising three or more data elements based on the access attempt from the user device, store the data tuple in the database, wherein the data tuple comprises at least a one-time code generated by an access device, a current time and the user identifier, and log a successful access attempt by the user device when the user identifier is identified as being part of a list of user identifiers.

A non-transitory computer readable storage medium configured to store instructions that when executed cause a processor to perform at least one of receiving an access attempt from a user device, retrieving a user identifier associated with the user device stored in a database, creating a data tuple comprising three or more data elements based on the access attempt from the user device, storing the data tuple in the database, and the data tuple comprises at least a one-time code generated by an access device, a current time and the user identifier, and logging a successful access attempt by the user device when the user identifier is identified as being part of a list of user identifiers.

DETAILED DESCRIPTION OF THE APPLICATION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide a security application operating on a user device, such as a smartphone, cellular phone, tablet device, laptop or other computing device with a memory and processor. The security application may communicate with a network to reach a remote destination, such as a security access server. The user of the smartphone may have installed an application that includes a quick response (QR) code reader function. The location of interest (e.g., conference room, meeting room, etc.) may have a display that is connected to a network and which has a dynamically changing set of patterns, QR codes, sequence information, etc. As a user approaches the display, the smartphone may be used to scan the code on the display as the user enters the location. The information on the display (e.g., QR code), may change at a specified interval such as 10 Hz or 1 Hz (i.e., once per second or fraction thereof). The user may scan the display with their smartphone, take a picture of the display or communicate with the display via BLUETOOTH or a near field communication (NFC) signal via a NFC antenna on the display device communicating with the user's smartphone.

Figure 1:
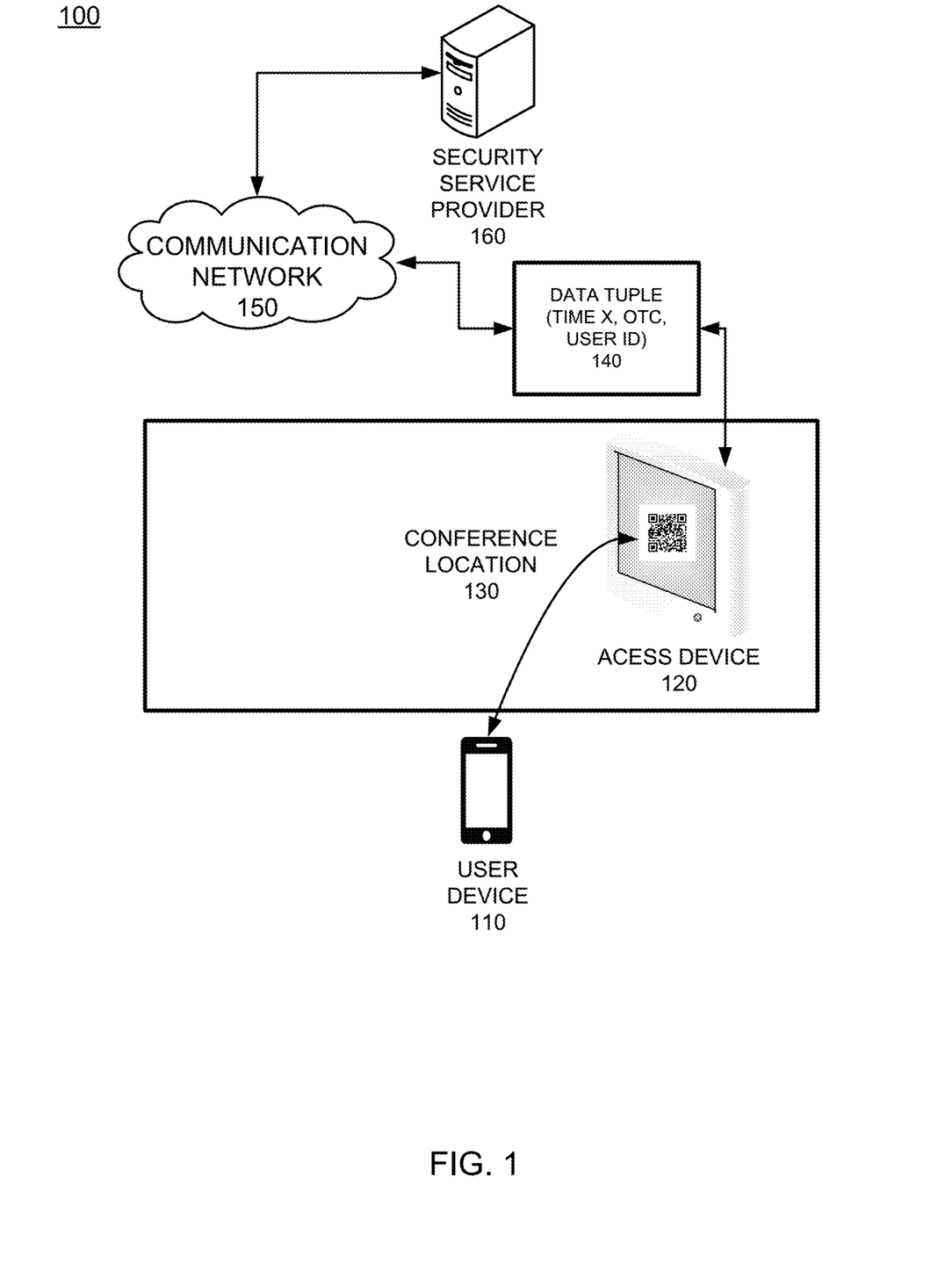
FIG. 1 illustrates an example communication network system example of a user device accessing a conference according to example embodiments.

FIG. 1 illustrates an example communication network system example of managing security access of users according to example embodiments. Referring to FIG. 1, the network diagram 100 includes a user device 110, such as a smartphone or other computing device configured with an application that permits access to the access device 120 as an access point, which may be located at or near a conference location 130. In operation, the user device may use a camera function to scan a one-time use code, such as a QR code on the display of the access device as an entry data element to a data tuple for that particular device at that particular time. The data tuple may be generated and formed as a trio of data, such as: Tx (timestamp at time 'x'), OTC (one-time code at time x), and the user identifier (ID)). This data tuple 140 may be a timestamp at a present time, coupled with a one-time code presented by the access device, and which changes according to a set frequency interval of updates, and also a user identifier (ID), which remains static and does not change throughout an event as the user device will remain constant for a particular event and the ID may be based on a device software code, a hardware address, or other static information linked to the device. The data tuple 140 may be communicated across a network 150 to a security service provider server 160 for record keeping. Each attendee will have a unique set of data tuples generated during the entrance and exit to the venue of interest. Also, the different user devices will be unique and will not interfere with one another thus providing an accurate device-to-person recordation of attendees.

Figure 2:
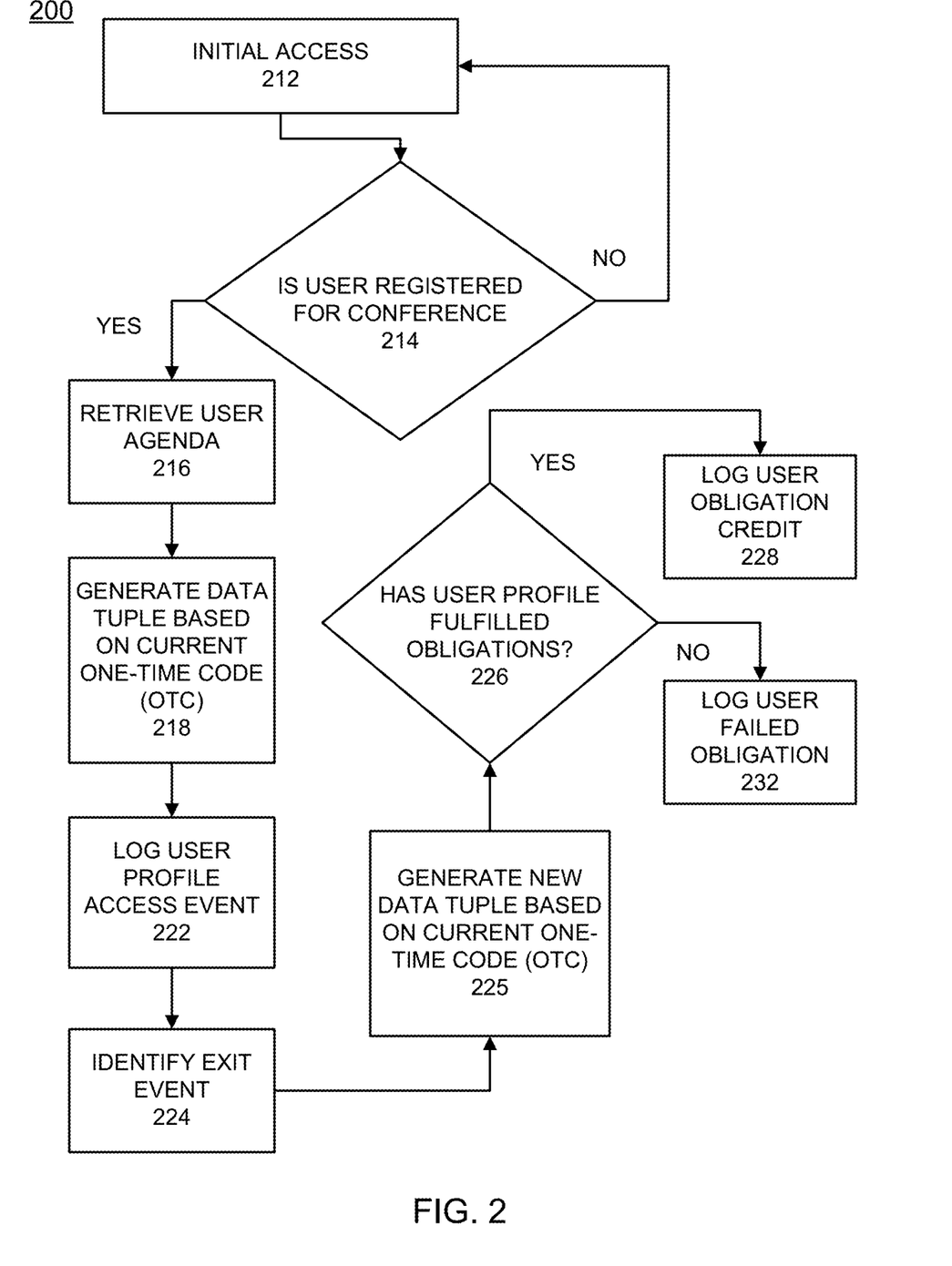
FIG. 2 illustrates a flow diagram procedure for identifying a user device at a conference access point and crediting the user profile with having attended the conference according to example embodiments.

FIG. 2 illustrates a flow diagram procedure for identifying a user device at a conference access point and crediting the user profile with having attended the conference according to example embodiments. Referring to FIG. 2, the diagram 200 includes an initial access operation 212, such as a user device scanning a QR code and/or coming with a certain distance of the access device location to trigger a BLUETOOTH signal or NFC wireless communication signal that indicates the user's presence via their device. An initial determination 214 may be performed to determine whether the user ID is even registered to be at the current location at the current time. If so, the user's agenda 216 may be optionally downloaded and provided to the user for reference purposes and to identify whether the user's presence is required at other locations during a conference with multiple sessions.

As the user device reference data is used to populate the data tuple 218, the one-time code may change constantly to avoid mismatches with users and their unique reference identifiers. The code may change 10 times per second, 100 times per second or only once every few seconds, depending on the nature of the needs of the security identification system. The data tuple created for the user device may be among many data tuples for many devices. The example of a single user provides a reference for example purposes and should not be limited to one user for purposes of this disclosure. The data tuple is logged in a database 222 and when an exit event occurs, the exit event 224 may be the user device interaction with the access point device which creates, in turn, another/new data tuple 225 at an exit time. A comparison of the data tuple data may be performed to identify which conference was attended, which time it was attended, which user devices were present at the conference, and a total length of time for the attendance by each user device. This information provides a record as to whether a user profile (ID) should be credited with fulfilling an attendance or other obligation 226. If so, the user obligation credit 228 is provided to the user account, and if not, the failed obligation is noted 232 in the user's profile.

Figure 3:
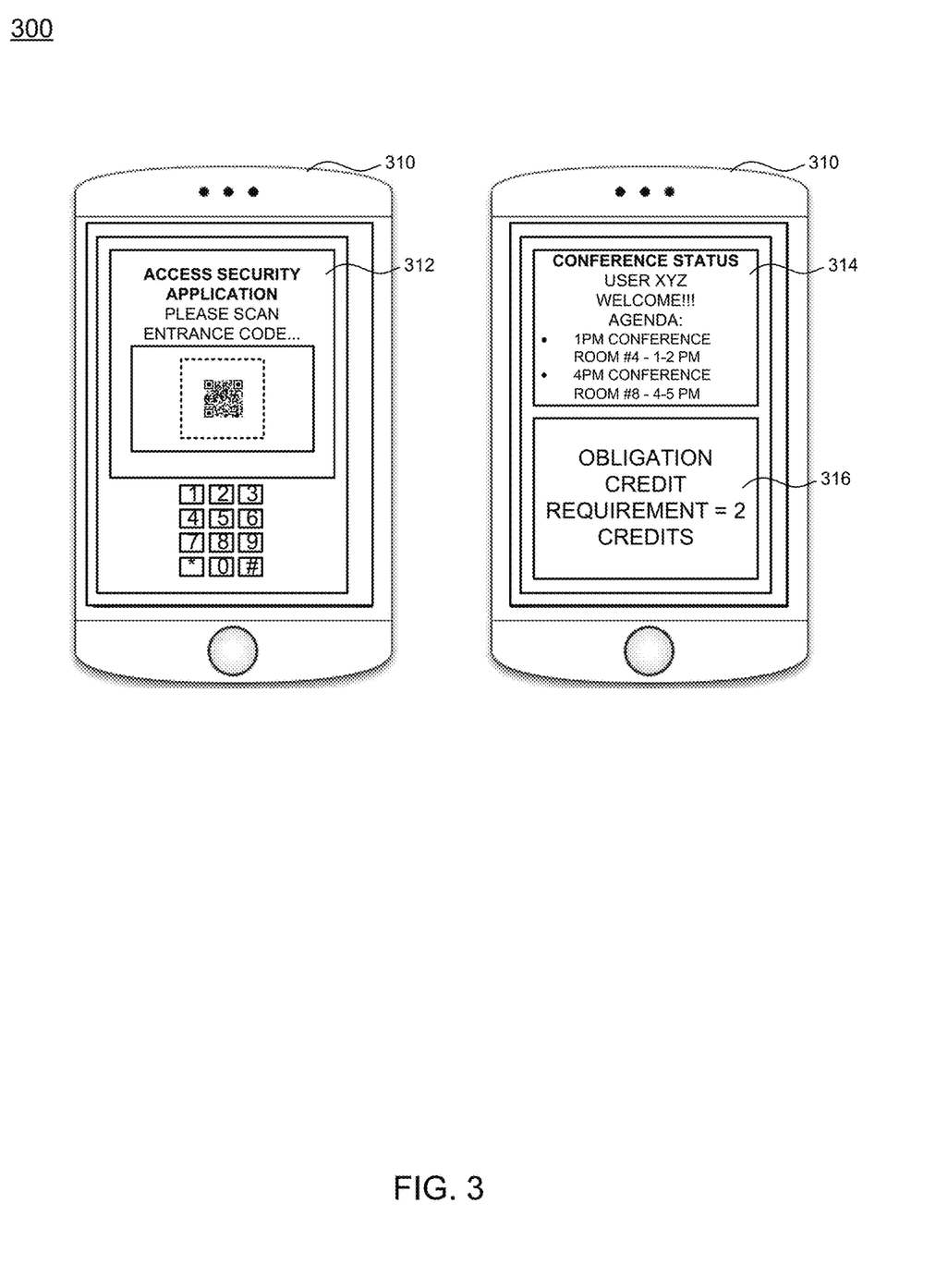
FIG. 3 illustrates a user interface configured to provide conference access and record management for a conference attendee according to example embodiments.

FIG. 3 illustrates a user interface configured to provide conference access and record management for a conference attendee according to example embodiments. Referring to FIG. 3, the user interfaces 300 include a user device 310 operating an access application for a security management configuration of a conference management application. In an initial function, as the user device approaches the entry access point of the conference, the user device may scan a QR code 312 as an initial function to access and log the user access to the conference. The QR code or other digitally recognized code may be dynamic and may be present via a display located at the point of entry of the conference. Once the user device is recognized by the profile server, the user's conference status information 314 and agenda may be provided to the user along with a list of credits 316 that the user may be responsible for collecting to satisfy a condition of an employer or other interested entity.

Figure 4:
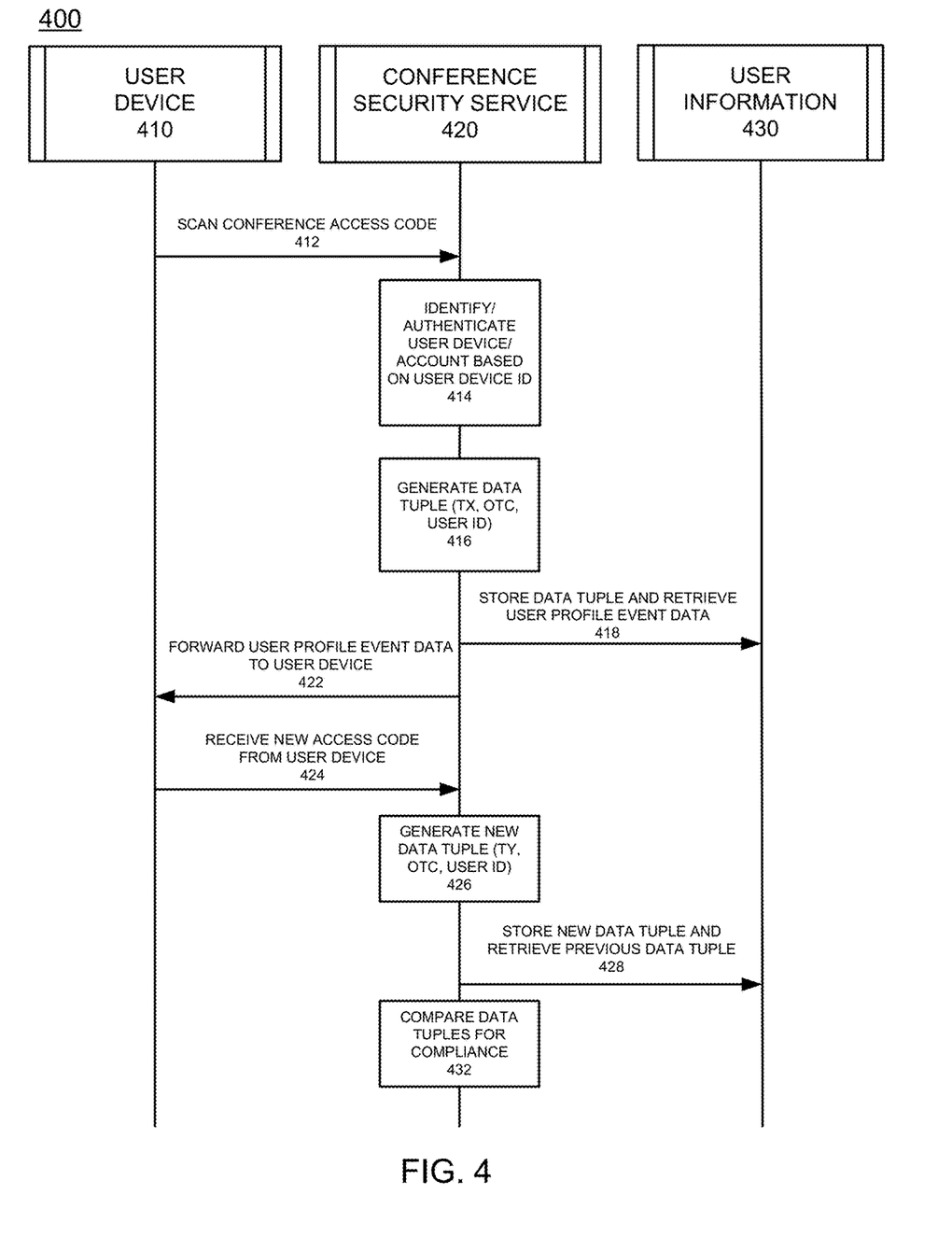
FIG. 4 illustrates a system signaling diagram for performing conference access and exit actions according to example embodiments.

FIG. 4 illustrates a system signaling diagram for performing conference access and exit actions according to example embodiments. Referring to FIG. 4, the system 400 provides a user device 410 accessing a conference security system (server) 420 and a database or record or user information 430. In operation, a user device 410 may scan a conference access code, which is received 412 as an access attempt from the user device at the security server 420. The method may also include retrieving a user identifier associated with the user device stored in a database and identifying the user device 414 based on a particular user ID. The process continues by creating a data tuple 416 that includes three or more data elements based on the access attempt from the user device. The method may also include storing the data tuple 418 in the database of user information 430, and the data tuple may include at least a one-time code generated by an access device, a current time and the user identifier based on the user device profile. The system may log a successful access attempt by the user device when the user identifier is identified as being part of a list of user identifiers.

The system application may also retrieve and forward user profile event data to the user device for convenience 422 and receive a new access code from the user device 424 at a later time, when the user device is moved towards the exit after a period of time since the arrival, and has positively engaged with the access device for an exit transaction. When this occurs, the new tuple may be created 426 and stored 428, and then the two tuples can be compared 432 to identify compliance with third party measures (e.g., has the user attended the conference or not).

When comparing the new data tuple to the data tuple, one of the data elements of the new data tuple must match one of the data elements of the data tuple and the new access attempt is valid if that match can be confirmed, otherwise the new access attempt is deemed invalid. Responsive to identifying the new access attempt is valid, the current time of the data tuple may be compared to a current time associated with the new data tuple to determine a time difference, and whether the time difference is greater than or equal to an expected time difference (e.g., has the user attended the majority of one hour of the 1-hour conference). When the time different is greater than or equal to the expected time difference, the user identifier is credited with a user obligation credit for fulfilling an attendance obligation. In general, only one data element of the new data tuple will match one data element of the data tuple (e.g., the user ID). The OTC and the timestamp should be different. The access device continuously displays one-time access codes, which change according to a fixed frequency change rate.

Figure 5:
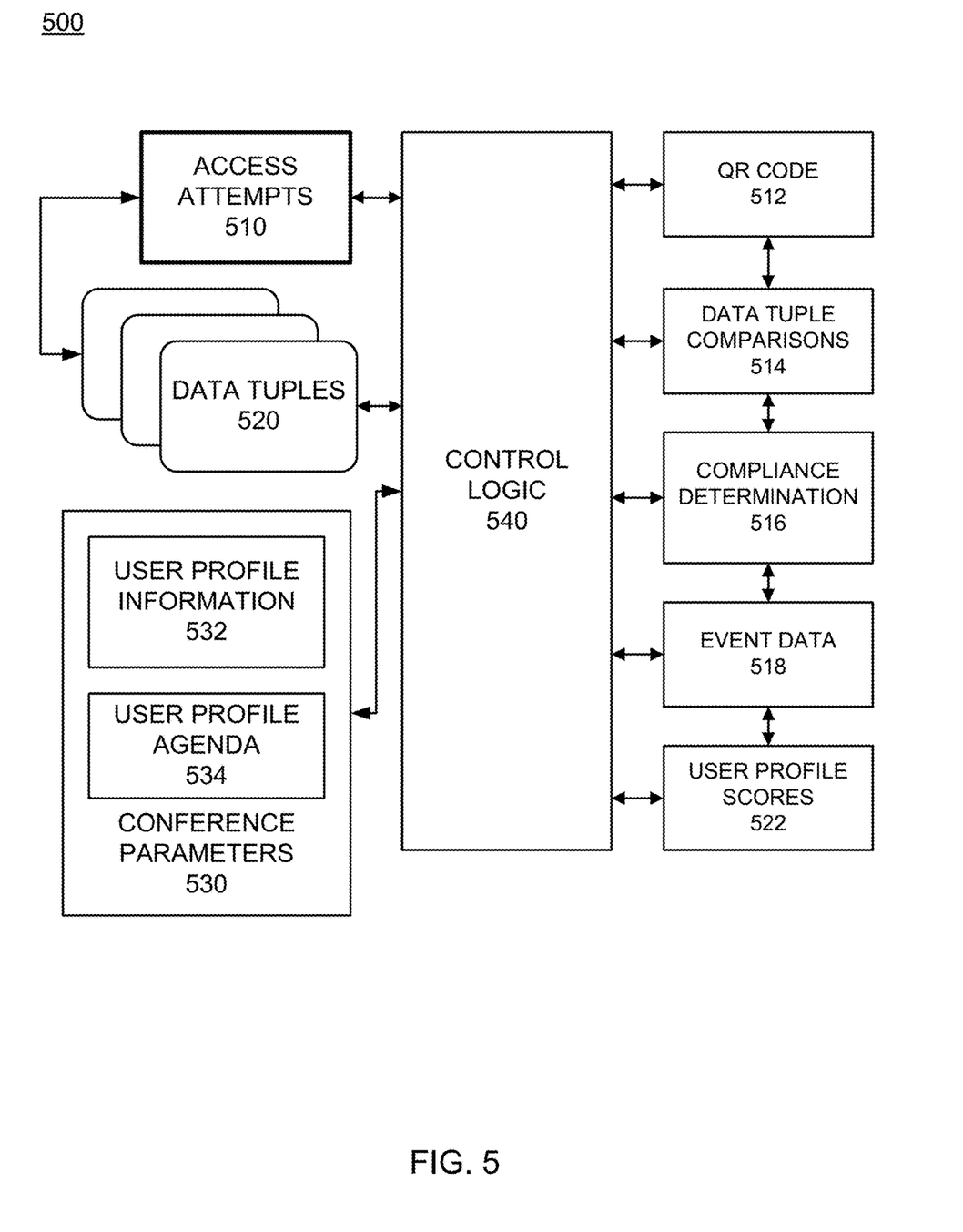
FIG. 5 illustrates a logic diagram with example data input and output parameters for a conference management application according to example embodiments.

FIG. 5 illustrates a logic diagram with example data input and output parameters for a conference management application according to example embodiments. Referring to FIG. 5, the control logic 540 may be a processor receiving access attempts by one or more user devices 510 via an access/security application operating on a server. The attempts include data tuples of information received 520 along with conference parameters 530, such as user information 532 and conference agenda information 534 retrieved and provided to the user devices. The output of the data logic may include a QR code 512 generated for promoting ongoing access attempts, comparison information 514 of various data tuples received, compliance determinations 516, event data 518 and user profile scores and updates to the scores for compliance measures 522.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
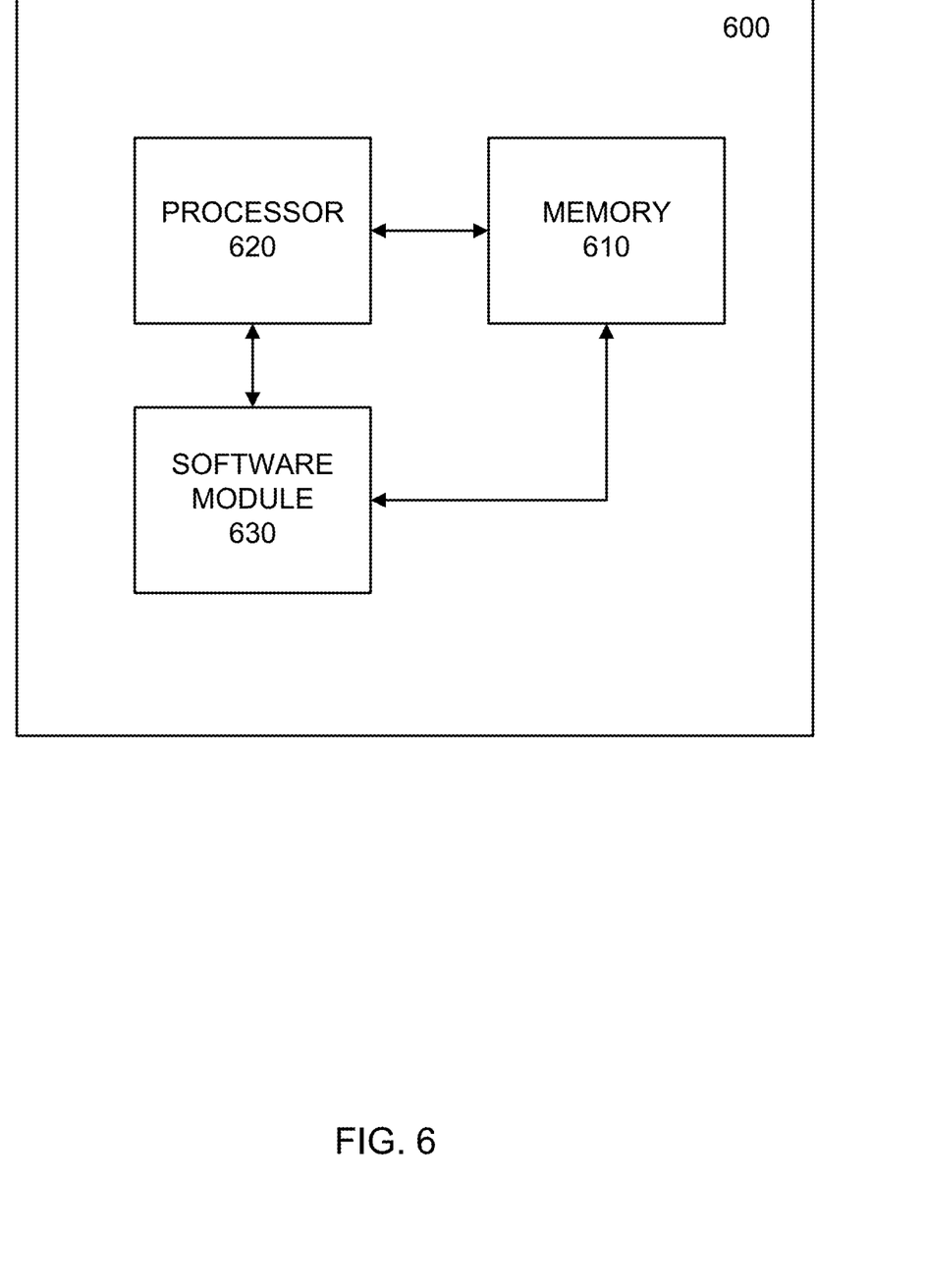
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
   receiving an access attempt from a user device;
   retrieving, from a database, a user identifier associated with the user device;
   creating a data tuple comprising at least a one-time code scanned by the user device from an access device, a current time, and the user identifier based on the access attempt from the user device;
   storing the data tuple in the database;
   logging a successful access attempt by the user device when the user identifier is identified as being part of a list of user identifiers based on the data tuple;
   identifying a new access attempt by the user device at a later time than a time associated with the access attempt;
   responsive to receiving the new access attempt, generating a new data tuple; and
   identifying whether the new access attempt is valid based on a comparison of the data tuple and the new data tuple.

2. The method of claim 1, wherein the identifying whether the new access attempt is valid further comprises:
   confirming that the new access attempt is valid based on one of the data elements of the new data tuple matching one of the data elements of the data tuple.

3. The method of claim 1, wherein the identifying whether the new access attempt is valid further comprises:
   confirming that the new access attempt is invalid based on none of the data elements of the new data tuple matching any of the data elements of the data tuple.

4. The method of claim 2, further comprising:
   responsive to the confirming that the new access attempt is valid, comparing the current time of the data tuple to a current time associated with the new data tuple to determine a time difference;
   determining whether the time difference is greater than or equal to an expected time difference; and
   when the time different is greater than or equal to the expected time difference, crediting the user identifier with a user obligation credit for fulfilling an attendance obligation.

5. The method of claim 2, wherein only one data element of the new data tuple matches one data element of the data tuple.

6. The method of claim 1, wherein the access device continuously displays one-time access codes that change according to a fixed frequency change rate.

7. A system comprising:
   a user device; and
   a security server configured to:
   receive an access attempt from the user device,
   retrieve, from a database, a user identifier associated with the user device,
   create a data tuple comprising at least a one-time code scanned by the user device from an access device, a current time, and the user identifier based on the access attempt from the user device,
   store the data tuple in the database, and
   log a successful access attempt by the user device when the user identifier is identified as being part of a list of user identifiers based on the data tuple;
   identify a new access attempt by the user device at a later time than a time associated with the access attempt; and
   responsive to receiving the new access attempt, generate a new data tuple; and
   identify whether the new access attempt is valid based on a comparison of the data tuple and the new data tuple.

8. The system of claim 7, wherein, when the security server is configured to identify whether the new access attempt is valid, the security server is further configured to:
   compare the new data tuple to the data tuple;
   identify one of the data elements of the new data tuple matches one of the data elements of the data tuple; and
   confirm that the new access attempt is valid based on one of the data elements of the new data tuple matching one of the data elements of the data tuple.

9. The system of claim 7, wherein, when the security server is configured to identify whether the new access attempt is valid, the security server is further configured to:
   confirm that the new access attempt is invalid based on none of the data elements of the new data tuple matching any of the data elements of the data tuple.

10. The system of claim 8, wherein the security server is further configured to:
    responsive to the new access attempt being confirmed as valid, compare the current time of the data tuple to a current time associated with the new data tuple to determine a time difference;

determine whether the time difference is greater than or equal to an expected time difference; and when the time different is greater than or equal to the expected time difference, credit the user identifier with a user obligation credit for fulfilling an attendance obligation.

11. The system of claim 8, wherein only one data element of the new data tuple matches one data element of the data tuple.

12. The system of claim 7, wherein the access device continuously displays one-time access codes that change according to a fixed frequency change rate.

13. A non-transitory computer readable storage medium configured to store one or more instructions that when executed by a processor cause the processor to perform:

receiving an access attempt from a user device;

retrieving, from a database, a user identifier associated with the user device;

creating a data tuple comprising at least a one-time code scanned by the user device from an access device, a current time, and the user identifier based on the access attempt from the user device;

storing the data tuple in the database;

logging a successful access attempt by the user device when the user identifier is identified as being part of a list of user identifiers based on the data tuple;

identifying a new access attempt by the user device at a later time than a time associated with the access attempt;

responsive to receiving the new access attempt, generating a new data tuple; and identifying whether the new access attempt is valid based on a comparison of the data tuple and the new data tuple.

14. The non-transitory computer readable storage medium of claim 13, wherein the identifying whether the new access attempt is valid further comprises:

confirming that the new access attempt is valid based on one of the data elements of the new data tuple matching one of the data elements of the data tuple.

15. The non-transitory computer readable storage medium of claim 13, wherein the identifying whether the new access attempt is valid further comprises:

confirming that the new access attempt is invalid based on none of the data elements of the new data tuple matching any of the data elements of the data tuple.

16. The non-transitory computer readable storage medium of claim 14, wherein the one or more instructions further cause the processor to perform:

responsive to the confirming that the new access attempt is valid, comparing the current time of the data tuple to a current time associated with the new data tuple to determine a time difference;

determining whether the time difference is greater than or equal to an expected time difference; and when the time different is greater than or equal to the expected time difference, crediting the user identifier with a user obligation credit for fulfilling an attendance obligation.

17. The non-transitory computer readable storage medium of claim 14, wherein only one data element of the new data tuple matches one data element of the data tuple, wherein the access device continuously displays one-time access codes that change according to a fixed frequency change rate.

* * * * *